United States Patent
Miura et al.

(10) Patent No.: US 7,027,751 B2
(45) Date of Patent: Apr. 11, 2006

(54) ELECTROPHOTOGRAPHIC IMAGE FORMING APPARATUS HAVING RESIDUAL TONER COLLECTION

(75) Inventors: Tetsuroh Miura, Tokyo (JP); Katsuaki Miyawaki, Kanagawa (JP); Takeshi Saitou, Tokyo (JP); Takeo Suda, Tokyo (JP); Yasushi Nakazato, Tokyo (JP); Yasuo Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/612,146

(22) Filed: Jul. 3, 2003

(65) Prior Publication Data

US 2004/0057059 A1 Mar. 25, 2004

(30) Foreign Application Priority Data

Jul. 4, 2002 (JP) ............................. 2002-195743

(51) Int. Cl.
*G03G 21/20* (2006.01)
(52) U.S. Cl. .......................................... 399/92; 399/94
(58) Field of Classification Search ................. 399/44, 399/91, 92, 94, 97, 98, 149, 252
See application file for complete search history.

(56) References Cited

U.S. PATENT DOCUMENTS

| | | | | |
|---|---|---|---|---|
| 5,038,170 A | * | 8/1991 | Serita | 399/92 |
| 5,038,174 A | * | 8/1991 | Kato et al. | 399/92 |
| 5,081,496 A | * | 1/1992 | Takeda | 399/92 |
| 5,530,523 A | * | 6/1996 | Kawabata | 399/44 |
| 5,539,500 A | * | 7/1996 | Hamamichi et al. | 399/97 |
| 6,077,636 A | * | 6/2000 | Moriki et al. | 399/252 X |
| 6,137,977 A | * | 10/2000 | Okado et al. | 399/252 |
| 6,141,512 A | * | 10/2000 | Nagano et al. | 399/92 |
| 6,219,504 B1 | * | 4/2001 | Matsuzaki et al. | 399/92 |
| 6,295,435 B1 | | 9/2001 | Shinohara et al. | |
| 6,308,024 B1 | * | 10/2001 | Nakayama et al. | 399/98 |
| 6,336,013 B1 | | 1/2002 | Suda et al. | |
| 6,381,435 B1 | | 4/2002 | Shinohara et al. | |
| 6,463,237 B1 | | 10/2002 | Suda et al. | |
| 6,470,169 B1 | | 10/2002 | Nakazato | |
| 6,501,922 B1 | * | 12/2002 | Ihara et al. | 399/92 |
| 6,560,414 B1 | | 5/2003 | Suda et al. | |
| 6,567,629 B1 | * | 5/2003 | Anderson et al. | 399/92 |
| 6,771,916 B1 | * | 8/2004 | Hoffman et al. | 399/92 |

FOREIGN PATENT DOCUMENTS

| | | |
|---|---|---|
| JP | 1-90154 | 4/1989 |
| JP | 6-83153 | 3/1994 |

(Continued)

*Primary Examiner*—Sandra L. Brase
(74) *Attorney, Agent, or Firm*—Oblon, Spivak, McClelland, Maier & Neustadt, P.C.

(57) ABSTRACT

An electrophotographic image forming apparatus of the present invention includes a photoconductive drum provided with a photoconductive layer on its surface. A charger uniformly charges the surface of the drum while an exposing unit exposes the charged surface of the drum to thereby form a latent image on the drum. A developing device develops the latent image with toner by feeding the toner to the drum to thereby produce a corresponding toner image and collects residual toner left on the drum after image transfer. An image transferring device transfer the toner image from the drum to an intermediate image transfer body. An air conditioning unit sends dehumidified, air-controlled air to a space around said photoconductive element.

28 Claims, 3 Drawing Sheets

FOREIGN PATENT DOCUMENTS

| | | |
|---|---|---|
| JP | 7-301977 | 11/1995 |
| JP | 8-44259 | 2/1996 |
| JP | 9-50214 | 2/1997 |
| JP | 10-104897 | 4/1998 |
| JP | 10-340030 | 12/1998 |
| JP | 11-184334 | 7/1999 |
| JP | 2000-98855 | 4/2000 |
| JP | 2000-321849 | 11/2000 |

* cited by examiner

ELECTROPHOTOGRAPHIC IMAGE FORMING APPARATUS HAVING RESIDUAL TONER COLLECTION

BACKGROUND OF THE INVENTION

1. Field of the Invention

The present invention relates to an electrophotographic color image forming apparatus capable of protecting images from degradation ascribable to residual toner and reversely transferred toner present on a photoconductive element and reducing blur ascribable to nitric acid and metal nitrates derived from discharge products and depositing on the photoconductive element.

2. Description of the Background Art

Today, a copier, printer, facsimile apparatus or similar electrophotographic image forming apparatus provided with a cleanerless configuration, i.e., not including a cleaning unit is attracting attention from the size and cost reduction standpoint. Japanese Patent Laid-Open Publication Nos. 10-240004 and 2000-321849, for example, each propose a cleanerless image forming apparatus in which a developing unit feeds toner to a photoconductive element for forming a toner image and, at the same time, collects residual toner left on the photoconductive element after image transfer. On the other hand, Japanese Patent Laid-Open Publication No. 11-282320, for example, discloses a cleanerless image forming apparatus in which a brush, held in contact with a photoconductive element, temporarily collects residual toner and then returns it to the photoconductive element at preselected timing, so that the toner is collected in a developing unit. The above document teaches that the function of the brush may be assigned to a charger.

The problem with an electrophotographic image forming apparatus is that discharge from a charger, which uniformly charges the surface of a photoconductive element, produces NOx (nitrogen oxides), ozone and other discharge products. NOx, for example, reacts with moisture present in air to thereby produce nitric acid that, in turn, reacts with metal to produce metal nitrates. Forming a thin film on the photoconductive element, such nitric acid and metal oxides absorb moisture and thereby lower the surface resistance of the photoconductive element. As a result, a latent image formed on the photoconductive element is disturbed with the result that the resulting toner image is blurred.

While an image forming apparatus of the type including a cleaning unit can shave off the film of nitric acid and metal nitrates with a cleaning blade, the cleanerless image forming apparatus cannot do so. In light of this, the cleanerless image forming apparatus taught in Laid-Open Publication No. 10-240004 mentioned earlier uses a developing roller or an image transfer roller as grinding means for shaving off the above film.

The cleanerless image forming apparatus disclosed in Laid-Open Publication No. 2000-321849 also mentioned earlier teaches that a charger accommodates an optical catalyst therein for decomposing the discharge products.

However, none of the conventional cleanerless image forming apparatuses is provided with an implementation for reducing the amount of residual toner to remain on the photoconductive element. Consequently, in the apparatus of the type effecting development and cleaning at the same time, irregular charging and defective exposure become more likely to occur with an increase in the amount of residual toner, lowering image quality little by little. In the apparatus of the type using a brush, when much residual toner is present or in a repeat print mode, it is likely that residual toner deposits on the brush in an amount too much to be held by the brush, aggravating irregular charging and defective exposure and lowering image quality little by little. In the repeat print mode, if the residual toner deposited on the brush is returned to the photoconductive element and then collected in the developing unit every time a preselected number of prints are output, the ability of the brush and therefore image quality may be enhanced. This scheme, however, lowers printing speed.

A color image forming apparatus has a problem that when toner images of different colors are sequentially transferred from photoconductive elements to a recording medium, intermediate image transfer body or similar subject body, a toner image already transferred to the subject body is reversely transferred to the photoconductive drums. In the cleanerless system, the toner reversely transferred brings about irregular charging and defective exposure in combination with the residual toner, lowering the image quality of the next color. Moreover, because the reverse transfer of toner occurs in the preceding step, the toner collected in the developing unit in the following step gives rise to a color mixture problem, further lowering image quality.

In a color image forming apparatus of the type developing latent images formed on a single photoconductive element with toner of different colors, the residual toner is also derived from the preceding step and therefore aggravates color mixture in the individual developing unit.

The residual toner and reverse toner transfer are ascribable mainly to the fact that the amount of charge differs from one toner grain to another toner grain. Further, the residual toner and reversely transferred toner include even toner grains charged to polarity opposite to expected polarity and unable to move in a preselected image transfer direction.

When grinding means is used to shave off the thin film of nitric acid and metal nitrates, as taught in Laid-Open Publication No. 10-240004, the grinding means shaves off the surface of the photoconductive element at the same time, causing the photoconductive element to wear little by little.

The optical catalyst scheme disclosed in Laid-Open Publication 2000-321849 has a problem that the optical catalyst must be positioned in close proximity to the surface of the photoconductive element and charger, i.e., needs an exclusive space in the vicinity of the photoconductive element and charger. Positioning the optical catalyst close to the photoconductive element and charger is contradictory to size and cost reduction achievable with the cleanerless system.

Technologies relating to the present invention are also disclosed in, e.g., Japanese Patent Laid-Open Publication Nos. 7-301977, 9-50214, 10-340030 and 2000-98855.

SUMMARY OF THE INVENTION

It is an object of the present invention to provide an image forming apparatus capable of reducing the residual toner and reversely transferred toner for thereby enhancing image quality.

It is another object of the present invention to provide an image forming apparatus capable of reducing nitric acid and metal nitrates ascribable to discharge products for thereby reducing the blur of an image.

An electrophotographic image forming apparatus of the present invention includes a photoconductive drum provided with a photoconductive layer on its surface. A charger uniformly charges the surface of the drum while an exposing unit exposes the charged surface of the drum to thereby form a latent image on the drum. A developing device develops the latent image with toner by feeding the toner to the drum to thereby produce a corresponding toner image and collects residual toner left on the drum after image transfer. An image transferring device transfer the toner image from the drum to an intermediate image transfer body. An air conditioning unit sends dehumidified, air-controlled air to a space around said photoconductive element.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
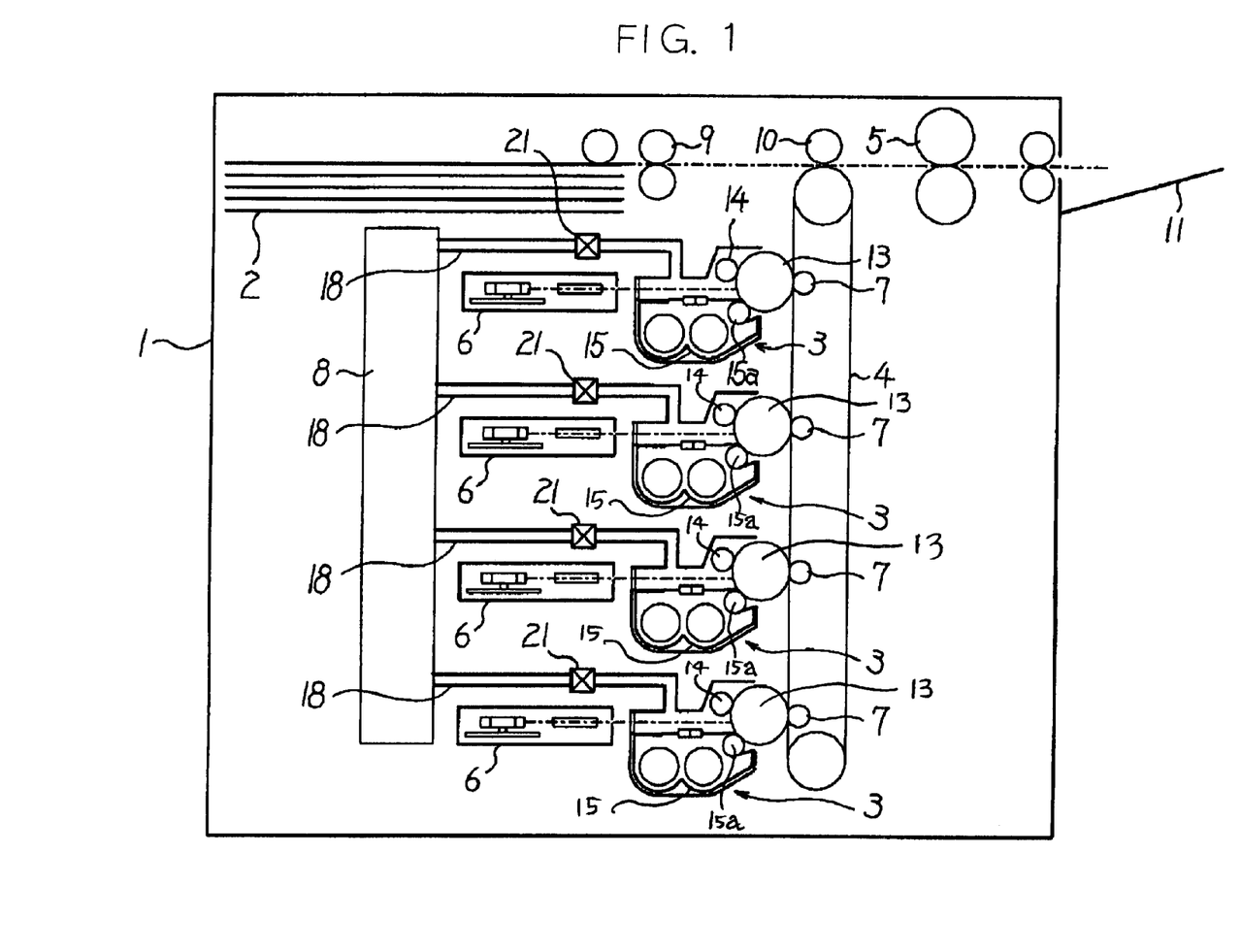
FIG. 1 is a view showing the general construction of an image forming apparatus embodying the present invention.

Referring to FIG. 1 of the drawings, an electrophotographic image forming apparatus embodying the present invention is shown and implemented as a tandem color image forming apparatus by way of example. As shown, the color image forming apparatus includes a casing 1 accommodating a sheet feeding section 2, four image forming modules 3, an intermediate image transfer belt, or subject body, 4, a fixing unit 5, four exposing units 6, four image transferring devices 7, and an air conditioning unit 8. The sheet feeding section 2 is loaded with a stack of sheets or recording media. The four image forming modules 3, removably mounted to the casing, each form a toner image with toner of particular color, i.e., yellow (Y), magenta (M), cyan (C) or black (K). The four exposing units 6 each are assigned to one of the image forming modules 3.

The four image transferring devices 7 respectively transfer toner images formed by the four image forming modules 3 to the intermediate image transfer belt (simply belt hereinafter) 4 one above the other. As a result, a full- or four-color image is completed on the belt 4. Subsequently, an image transferring device 10 transfers the full-color image from the belt 4 to a sheet fed from the sheet feeding section 2 via a registration roller pair 9. The sheet is then conveyed to the fixing unit 5 to have the toner image fixed thereon and then driven out to a print tray 11.

Figure 2:
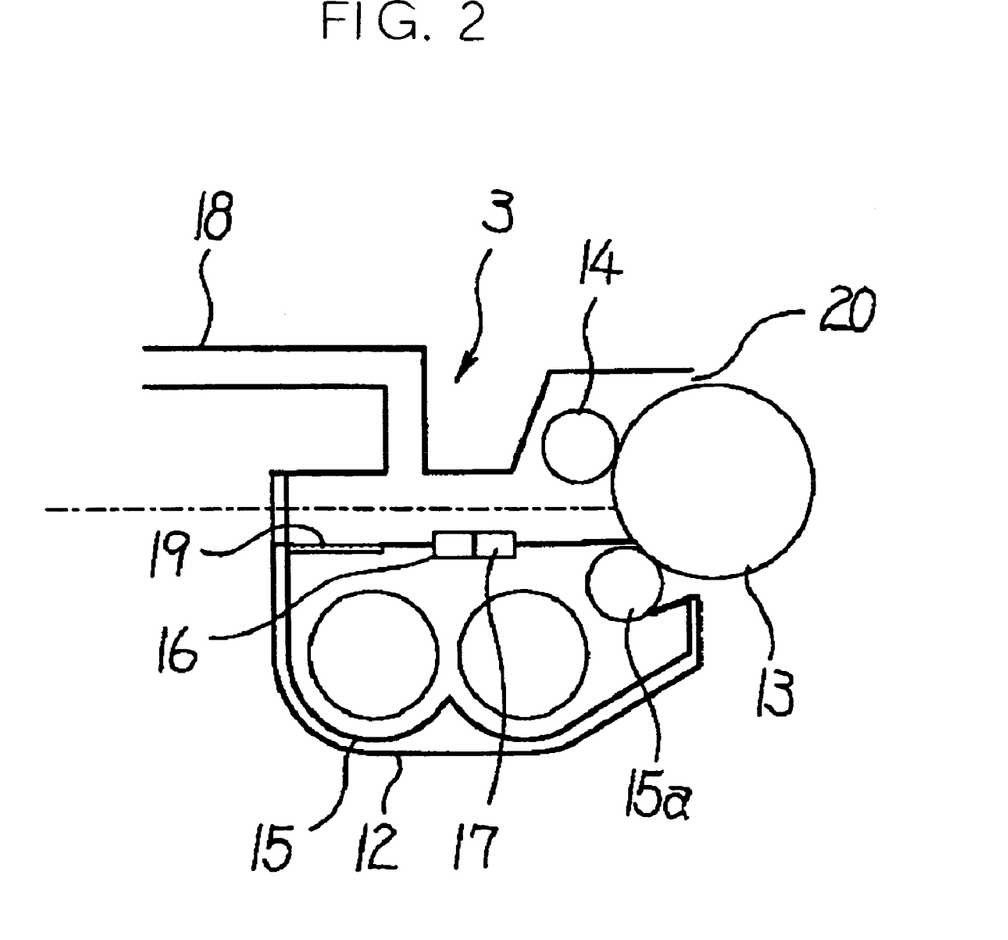
FIG. 2 is a fragmentary enlarged view showing an image forming module included in the illustrative embodiment.

The image forming modules 3 are identical in structure except for the color of toner to use. As shown in FIG. 2, each image forming module 3 includes a casing 12, a photoconductive drum or image carrier 13 disposed in the casing 12, a charge roller or contact type charger 14, a developing device 15, a humidity sensor 16, and a temperature sensor 17. The developing device 15 stores toner of particular color, which is produced by polymerization to have a uniform shape and a uniform grain size. A developing roller 15a is positioned in the developing device 15. In the illustrative embodiment, the developing roller 15a not only develops a latent image formed on the drum 13 with the toner to thereby form a corresponding toner image, but also collects the toner left on the drum 13 after image transfer. The drum 13 has on its surface a photoconductive layer, not shown, which the exposing unit 6 scans with a light beam for thereby forming a latent image.

Referring again to FIG. 1, the air conditioning unit 8 includes a dehumidifier, not shown, for dehumidifying air, a temperature control section, not shown, for controlling air temperature, and a fan, not shown, for sending air thus dehumidified and controlled in temperature. For the dehumidifier, use may be made of structure including a case filled with a desiccant and positioned on an air flow path or a structure using a Pertier element by way of example. The temperature control section may be implemented by an air conditioner, heater or similar conventional device.

The air conditioning unit 8 is communicated to the image forming modules 3 by conduits 18, so that dehumidified, temperature-controlled air is sent from the air conditioning unit 8 to the image forming modules 3. In this sense, the conduits 18 and fan disposed in the air conditioning unit 8 constitute air sending means. Air thus introduced into each image forming module 3 flows via a space around the drum 13 and charge roller 14 while flowing into the developing device 15 via a filter 19 (see FIG. 2), which passes air, but does not pass toner. Subsequently, air flows out of the image forming module 3 via an opening 20 (see FIG. 2) formed in the casing 12. The drum 13 is partly exposed to the outside via the above opening 20.

A valve 21 whose opening is controllable is disposed in each conduit 18. Such valves 21, humidity sensors 16, temperature sensors 17 and the dehumidifier, temperature control section and fan included in the air conditioning unit 8 all are connected to a controller not shown. The controller drives the dehumidifier, temperature control section, fan and valves 21 in accordance with the outputs of the humidity sensors 16 and temperature sensors 17, so that dehumidified, temperature-controlled air is sent to any one of the image forming modules 3 needing it. For example, when humidity being sensed by a given humidity sensor 16 rises above a reference value, the controller drives the dehumidifier. Likewise, temperature being sensed by a give temperature sensor 17 rises above a reference value, the controller causes the temperature control section to lower temperature. Further, in a black-and-white mode, the controller opens only the valve 21 of the conduit 18 connected to the image forming module 3 assigned to black while closing the other valves 21. As a result, dehumidified, temperature-controlled air is sent only into the image forming module 3 assigned to black.

The operation of the illustrative embodiment will be described hereinafter. Toner images of different colors formed by the image forming modules 3 are sequentially transferred to the belt 4 one above the other by the image transferring devices 7, completing a full-color image on the belt 4. The full-color image is then transferred from the belt 4 to a sheet by the image transferring device. After the full-color image has been fixed on the sheet by the fixing unit 5, the sheet with the fixed toner image or print is driven out to the print tray 11.

More specifically, in each image forming module 3, the charge roller 14 uniformly charges the surface of the drum 13. The exposing unit 6 assigned to the image forming module 3 scans the charged surface of the drum 13 with a light beam in accordance with image data, thereby forming a latent image on the drum 13. The developing device 15 develops the latent image with toner to thereby form a corresponding toner image. The toner image is transferred from the drum 13 to the belt 4 by the image transferring device 7.

Assume that some toner is left on the drum 13 after the image transfer from the drum 13 to the belt 4. Then, because the surface potential of the drum 13 exposed by the exposing unit 6 differs from an image portion to a non-image portion, the residual toner in the non-image portion is transferred to the developing roller 15a during development effected by the developing device 15, i.e., collected by the developing device 15. Before the collection of the residual toner, the charge roller 14 uniformly charges the drum 13 in contact with the drum 13 and thereby uniforms the charge characteristic of the residual toner, promoting efficient toner collection.

Further, dehumidified, temperature-controlled air sent into each image forming module 3 stabilizes humidity and temperature around the drum 13 and therefore uniforms the amount of charge and adhesion of the individual toner grain. This successfully enhances an image transfer ratio for thereby reducing the amount of residual toner. In addition, because the amount of charge and adhesion of the individual toner grain is uniform, the toner once transferred to the belt 4 is prevented from being reversely transferred to the drum 13, so that color mixture in the developing devices 15 is obviated.

Also, by lowering temperature around the drum 13, it is possible to prevent discharge products derived from the discharge of the discharge roller 14 from reacting with moisture and producing nitric acid and metal nitrates.

The illustrative embodiment therefore obviates irregular charging and defective exposure ascribable to much residual toner or reversely transferred toner present on the drum 13. Also, the illustrative embodiment obviates blur ascribable to nitric acid and metal nitrates otherwise forming a film on the drum 13.

Furthermore, dehumidified, temperature-controlled air output from the air conditioning unit 8 is not sent to the entire space of the casing 1, but is sent to only the image forming modules each having a small capacity. This is successful to reduce the size of the air conditioning unit 8 and therefore noise and power consumption ascribable to the drive of the air conditioning unit 8.

If desired, an air conditioning unit may be disposed in the individual image forming module 3, in which case the conduits 18 will be omitted. In this configuration, the air conditioning unit can be dismounted from the casing 1 together with the image forming module 3 and easily maintained.

Figure 3:
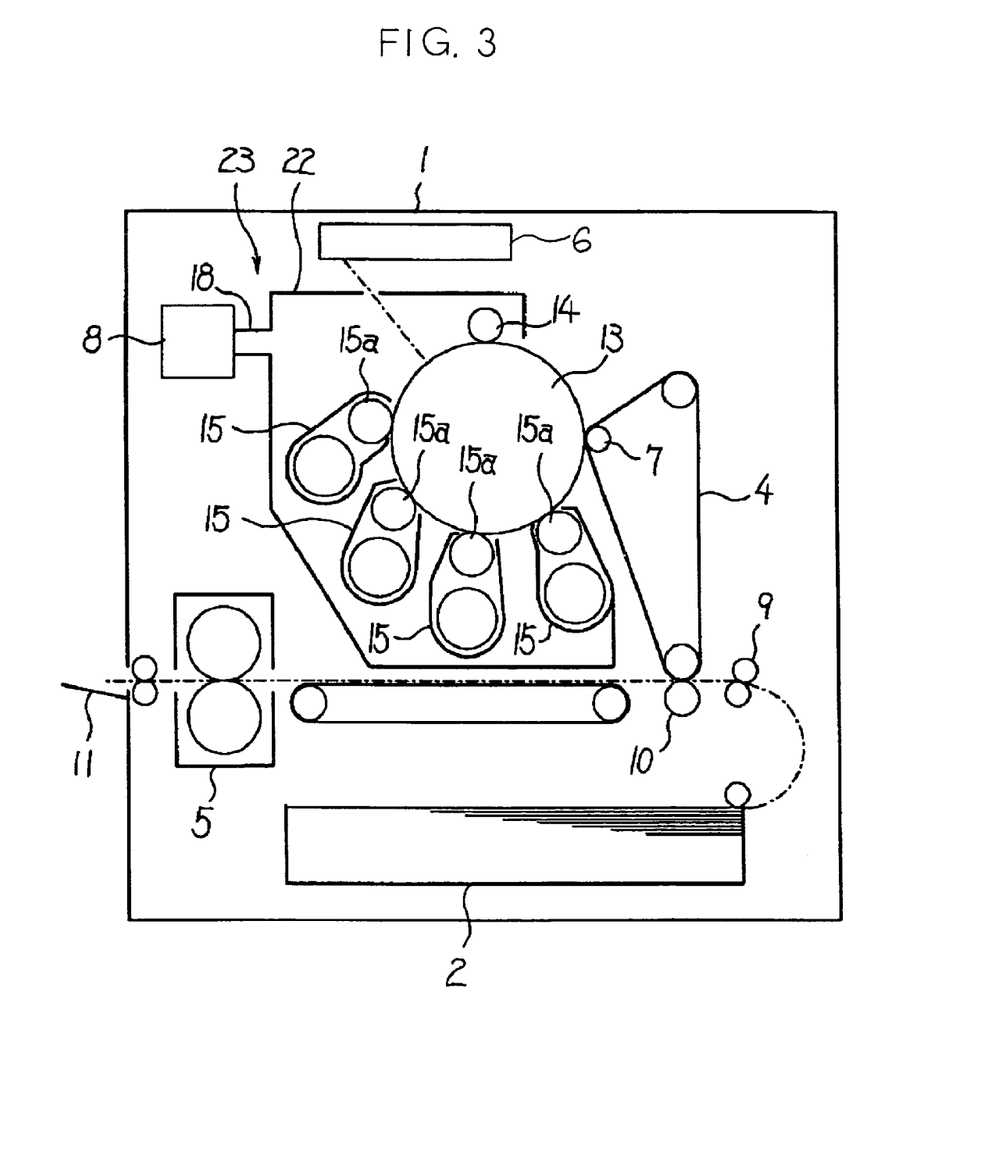
FIG. 3 is a view showing an alternative embodiment of the present invention.

An alternative embodiment of the present invention will be described with reference to FIG. 3. In FIG. 3, parts and elements identical with those shown in FIGS. 1 and 2 are designated by identical reference numerals and will not be described specifically later in order to avoid redundancy. As shown, a color image forming apparatus includes a single image forming module 23 accommodating one drum 13, one charge roller 14 and four developing devices 15 each storing toner of a particular color. The air conditioning unit 8 is communicated to the image forming module 23 by one conduit 18.

In operation, toner images of different colors are sequentially formed on the drum 13 while being sequentially transferred from the drum 13 to the belt 4 one above the other by the image transferring device 7, completing a full-color image on the belt 4. Subsequently, the full-color image is transferred from the belt 4 to a sheet fed from the sheet feeding section 2 by the image transferring device 10. After the full-color image has been fixed on the sheet by the fixing unit 5, the sheet or print is driven out to the print tray 11.

More specifically, any one of the developing devices 15 expected to develop a latent image is moved to a respective developing position close to the drum 13. Subsequently, the surface of the drum 13 is uniformly charged by the charge roller 14 and then exposed by the exposing unit 6 with the result that a latent image is formed on the drum 13. The latent image is developed by toner fed from the above developing device 15 to become a toner image. The toner image is then transferred from the drum 13 to the belt 4 by the image transferring device 7.

The toner left on the drum 13 after the image transfer is collected by the developing roller 15a during development for the same reason as described in relation to the previous embodiment. Again, before the collection of the residual toner, the charge roller 14 uniformly charges the drum 13 in contact with the drum 13 and thereby uniforms the charge characteristic of the residual toner, promoting efficient toner collection.

Further, dehumidified, temperature-controlled air sent into each image forming module 23 stabilizes humidity and temperature around the drum 13 and therefore uniforms the amount of charge and adhesion of the individual toner grain. This successfully enhances an image transfer ratio for thereby reducing the amount of residual toner. In addition, because the amount of charge and adhesion of the individual toner grain is uniform, the toner once transferred to the belt 4 is prevented from being reversely transferred to the drum 13, so that color mixture in the developing devices 15 is obviated.

Also, by lowering temperature around the drum 13, it is possible to prevent discharge products derived from the discharge of the discharge roller 14 from reacting with moisture and producing nitric acid and metal nitrates.

The illustrative embodiment therefore, like the previous embodiment, obviates irregular charging and defective exposure ascribable to much residual toner or reversely transferred toner present on the drum 13. Also, the illustrative embodiment obviates blur ascribable to nitric acid and metal nitrates otherwise forming a film on the drum 13.

Furthermore, dehumidified, temperature-controlled air output from the air conditioning unit 8 is not sent to the entire space of the casing 1, but is sent to only the image forming modules each having a small capacity. This is successful to reduce the size of the air conditioning unit 8 and therefore noise and power consumption ascribable to the drive of the air conditioning unit 8.

Various modifications will become possible for those skilled in the art after receiving the teachings of the present disclosure without departing from the scope thereof.

What is claimed is:

1. An electrophotographic image forming apparatus comprising:
   a photoconductive element provided with a photoconductive layer on a surface thereof;
   means for uniformly charging the surface of said photoconductive element;
   means for exposing the surface of said photoconductive element charged by said means for uniformly charging to thereby form a latent image;
   a developing unit configured to develop the latent image with toner, the development unit comprising a development roller configured to feed said toner to said photoconductive element to thereby produce a corresponding toner image and to collect residual toner left on said photoconductive element;
   means for transferring the toner image from said photoconductive element to a subject body;
   means for sending air to a space around said photoconductive element; and
   means for dehumidifying air to be sent by said means for sending;

wherein an image forming module accommodates said photoconductive element and said means for dehumidifying is disposed in the image forming module.

2. The apparatus as claimed in claim 1, wherein dehumidified air output from said means for dehumidifying is sent into the image forming module, said means for uniformly charging and said developing unit and removably mounted to a casing of said apparatus.

3. The apparatus as claimed in claim 1, wherein said means for uniformly charging comprises a contact type charger.

4. The apparatus as claimed in claim 1, wherein said means for dehumidifying controls air temperature while dehumidifying air.

5. The apparatus as claimed in claim 1, wherein the toner stored in said developing unit is produced by polymerization.

6. An electrophotographic image forming apparatus comprising:
- a plurality of photoconductive elements each being provided with a photoconductive layer on a surface thereof;
- a plurality of means each for uniformly charging the surface of one of said plurality of photoconductive elements;
- at least one means for exposing the surface of each of said plurality of photoconductive elements charged by one of said plurality of means for uniformly charging to thereby form a latent image;
- a plurality of developing units each configured to develop a latent image with toner of a particular color, each of the plurality of developing units comprising a developing roller configured to feed said toner of the particular color to one of said plurality of photoconductive elements to thereby produce a corresponding toner image and to collect residual toner left on the one of said plurality of photoconductive elements;
- a plurality of means each for transferring the toner image from one of said plurality of photoconductive elements to a subject body;
- means for sending air to spaces around said plurality of photoconductive elements; and
- means for dehumidifying air to be sent by said means for sending;
- wherein a plurality of image forming modules each accommodates one of said plurality of photoconductive elements and said means for dehumidifying is disposed in each of said image forming modules.

7. The apparatus as claimed in claim 6, wherein dehumidified air output from said means for sending is sent into said plurality of image forming modules, one of said plurality of means for uniformly charging and one of said plurality of developing units and removably mounted to a casing of said apparatus.

8. The apparatus as claimed in claim 6, wherein each of said plurality of means for uniformly charging comprises a contact type charger.

9. The apparatus as claimed in claim 6, wherein said means for dehumidifying controls air temperature while dehumidifying air.

10. The apparatus as claimed in claim 6, wherein the toner stored in each of said plurality of developing units is produced by polymerization.

11. An electrophotographic image forming apparatus comprising:
- a photoconductive element provided with a photoconductive layer on a surface thereof;
- means for uniformly charging the surface of said photoconductive element;
- means for exposing the surface of said photoconductive element charged by said means for uniformly charging to thereby form a latent image;
- a plurality of developing units arranged around said photoconductive element, each developing unit being configured to store toner of a particular color and to develop the latent image with said toner, and each developing unit comprising a development roller configured to feed said toner to said photoconductive element to thereby produce a corresponding toner image and to collect residual toner left on said photoconductive element;
- means for sequentially transferring toner images sequentially formed on said photoconductive element to a subject body one above the other;
- means for sending air to a space around said photoconductive element; and
- means for dehumidifying air to be sent by said means for sending;
- wherein an image forming module accommodates said photoconductive element and said means for dehumidifying is disposed in the image forming module.

12. The apparatus as claimed in claim 11, wherein dehumidified air output from said means for sending is sent into said image forming module, said means for uniformly charging and said plurality of developing units and removably mounted to a casing of said apparatus.

13. The apparatus as claimed in claim 11, wherein said means for uniformly charging comprises a contact type charger.

14. The apparatus as claimed in claim 11, wherein said means for dehumidifying controls air temperature while dehumidifying air.

15. The apparatus as claimed in claim 11, wherein the toner stored in each of said plurality of developing unit is produced by polymerization.

16. An electrophotographic image forming apparatus comprising:
- a photoconductive element provided with a photoconductive layer on a surface thereof;
- a charger configured to uniformly charge the surface of said photoconductive element;
- an exposing unit configured to expose the surface of said photoconductive element charged by said charger to thereby form a latent image;
- a developing device configured to develop the latent image with toner, the developing device comprising a development roller configured to feed said toner to said photoconductive element to thereby produce a corresponding toner image and to collect residual toner left on said photoconductive element;
- an image transferring device configured to transfer the toner image from said photoconductive element to a subject body;
- an air sending device for sending air to a space around said photoconductive element; and
- an air conditioning device for dehumidifying air to be sent by said air sending device;
- wherein an image forming module accommodates said photoconductive element and said air conditioning device is disposed in the image forming module.

17. An electrophotographic image forming apparatus comprising:

a plurality of photoconductive elements each being provided with a photoconductive layer on a surface thereof;

a plurality of chargers each being configured to uniformly charge the surface of one of said plurality of photoconductive elements;

at least one exposing unit configured to expose the surface of each of said plurality of photoconductive elements charged by one of said plurality of chargers to thereby form a latent image;

a plurality of developing devices each being configured to develop a latent image formed on one of said plurality of photoconductive elements with toner of a particular color, each of the plurality of developing devices comprising a developing roller configured to feed the toner of the particular color to respective one of the plurality of photoconductive elements to thereby produce a corresponding toner image and to collect residual toner left on the respective one of the plurality of photoconductive elements;

a plurality of image transferring devices each being configured to transfer the toner image from one of said plurality of photoconductive elements to a subject body;

an air sending device configured to send air to spaces around said plurality of photoconductive elements; and an air conditioning device configured to dehumidify air to be sent by said air sending device;

wherein a plurality of image forming modules each accommodates one of said plurality of photoconductive elements and said air conditioning device is disposed in the plurality of image forming modules.

18. An electrophotographic image forming apparatus comprising:

a photoconductive element provided with a photoconductive layer on a surface thereof;

a charger configured to uniformly charge the surface of said photoconductive element;

an exposing unit configured to expose the surface of said photoconductive element charged by said charger to thereby form a latent image;

a plurality of developing devices arranged around said photoconductive element and each being configured to store toner of a particular color for developing the latent image with said toner, each developing device comprising a developing roller configured to feed the toner to the photoconductive element to thereby produce a corresponding toner image and to collect residual toner left on said photoconductive element;

an image transferring device configured to sequentially transfer toner images sequentially formed on said photoconductive element to a subject body one above the other;

an air sending device configured to send air to a space around said photoconductive element; and an air conditioning device configured to dehumidify air to be sent by said air sending device;

wherein an image forming module accommodates the photoconductive element and said air conditioning device is disposed in the image forming module.

19. An electrophotographic image forming apparatus comprising:

a photoconductive element provided with a photoconductive layer on a surface thereof;

means for uniformly charging the surface of said photoconductive element;

means for exposing the surface of said photoconductive element charged by said means for uniformly charging to thereby form a latent image;

a developing unit configured to develop the latent image with toner, the development unit comprising a development roller configured to feed said toner to said photoconductive element to thereby produce a corresponding toner image and to collect residual toner left on said photoconductive element;

means for transferring the toner image from said photoconductive element to a subject body;

means for sending air to a space around said photoconductive element; and means for dehumidifying air to be sent by said means for sending;

wherein an image forming module is removably mounted to a casing of an apparatus body; the image forming module includes the photoconductive element, the means for uniformly charging the surface and the developing unit; and the means for dehumidifying air sends dehumidified air into the image forming module.

20. The electrophotographic image forming apparatus according to claim 19, wherein air sent into an image forming module is discharged to an outside of the image forming module only via an image transfer opening through which a part of the photoconductive element is exposed to the outside of the image forming module.

21. An electrophotographic image forming apparatus comprising:

a plurality of photoconductive elements each being provided with a photoconductive layer on a surface thereof;

a plurality of means each for uniformly charging the surface of one of said plurality of photoconductive elements;

at least one means for exposing the surface of each of said plurality of photoconductive elements charged by one of said plurality of means for uniformly charging to thereby form a latent image;

a plurality of developing units each configured to develop a latent image with toner of a particular color, each of the plurality of developing units comprising a developing roller configured to feed said toner of the particular color to one of said plurality of photoconductive elements to thereby produce a corresponding toner image and to collect residual toner left on the one of said plurality of photoconductive elements;

a plurality of means each for transferring the toner image from one of said plurality of photoconductive elements to a subject body;

means for sending air to spaces around said plurality of photoconductive elements; and means for dehumidifying air to be sent by said means for sending;

wherein an image forming module is removably mounted to a casing of an apparatus body; the image forming module includes at least one of the photoconductive elements at least one of the means each for uniformly charging the surface and at least one of the developing units; and the means for dehumidifying air sends dehumidified air into the image forming module.

22. The electrophotographic image forming apparatus according to claim 21, wherein air sent into an image forming module is discharged to an outside of the image forming module only via an image transfer opening through which a part of the photoconductive element is exposed to the outside of the image forming module.

23. An electrophotographic image forming apparatus comprising:
a photoconductive element provided with a photoconductive layer on a surface thereof;
means for uniformly charging the surface of said photoconductive element;
means for exposing the surface of said photoconductive element charged by said means for uniformly charging to thereby form a latent image;
a plurality of developing units arranged around said photoconductive element, each developing unit being configured to store toner of a particular color and to develop the latent image with said toner, and each developing unit comprising a development roller configured to feed said toner to said photoconductive element to thereby produce a corresponding toner image and to collect residual toner left on said photoconductive element;
means for sequentially transferring toner images sequentially formed on said photoconductive element to a subject body one above the other;
means for sending air to a space around said photoconductive element; and
means for dehumidifying air to be sent by said means for sending;
wherein an image forming module is removably mounted to a casing of an apparatus body; the image forming module includes the photoconductive element, the means for uniformly charging the surface and at least one of the developing units; and the means for dehumidifying air sends dehumidified air into the image forming module;
wherein air sent into an image forming module is discharged to an outside of the image forming module only via an image transfer opening through which a part of the photoconductive element is exposed to the outside of the image forming module.

24. An electrophotographic image forming apparatus comprising:
a photoconductive element provided with a photoconductive layer on a surface thereof;
a charger configured to uniformly charge the surface of said photoconductive element;
an exposing unit configured to expose the surface of said photoconductive element charged by said charger to thereby form a latent image;
a developing device configured to develop the latent image with toner, the developing device comprising a development roller configured to feed said toner to said photoconductive element to thereby produce a corresponding toner image and to collect residual toner left on said photoconductive element;
an image transferring device configured to transfer the toner image from said photoconductive element to a subject body;
an air sending device for sending air to a space around said photoconductive element; and
an air conditioning device for dehumidifying air to be sent by said air sending device;
wherein an image forming module is removably mounted to a casing of an apparatus body; the image forming module includes the photoconductive element, charger and developing device; and the air conditioning device sends dehumidified air into the image forming module.

25. The electrophotographic image forming apparatus according to claim 24, wherein
air sent into an image forming module is discharged to an outside of the image forming module only via an image transfer opening through which a part of the photoconductive element is exposed to the outside of the image forming module.

26. An electrophotographic image forming apparatus comprising:
a plurality of photoconductive elements each being provided with a photoconductive layer on a surface thereof;
a plurality of chargers each being configured to uniformly charge the surface of one of said plurality of photoconductive elements;
at least one exposing unit configured to expose the surface of each of said plurality of photoconductive elements charged by one of said plurality of chargers to thereby form a latent image;
a plurality of developing devices each being configured to develop a latent image formed on one of said plurality of photoconductive elements with toner of a particular color, each of the plurality of developing devices comprising a developing roller configured to feed the toner of the particular color to respective one of the plurality of photoconductive elements to thereby produce a corresponding toner image and to collect residual toner left on the respective one of the plurality of photoconductive elements;
a plurality of image transferring devices each being configured to transfer the toner image from one of said plurality of photoconductive elements to a subject body;
an air sending device configured to send air to spaces around said plurality of photoconductive elements; and
an air conditioning device configured to dehumidify air to be sent by said air sending device;
wherein an image forming module is removably mounted to a casing of an apparatus body; the image forming module includes at least one of the photoconductive elements, at least one of the chargers and at least one of the developing devices; and the air conditioning device sends dehumidified air into the image forming module.

27. The electrophotographic image forming apparatus according to claim 26, wherein
air sent into an image forming module is discharged to an outside of the image forming module only via an image transfer opening through which a part of the photoconductive element is exposed to the outside of the image forming module.

28. An electrophotographic image forming apparatus comprising:
a photoconductive element provided with a photoconductive layer on a surface thereof;
a charger configured to uniformly charge the surface of said photoconductive element;
an exposing unit configured to expose the surface of said photoconductive element charged by said charger to thereby form a latent image;
a plurality of developing devices arranged around said photoconductive element and each being configured to store toner of a particular color for developing the latent image with said toner, each developing device comprising a developing roller configured to feed the toner to the photoconductive element to thereby produce a corresponding toner image and to collect residual toner left on said photoconductive element;

an image transferring device configured to sequentially transfer toner images sequentially formed on said photoconductive element to a subject body one above the other;

an air sending device configured to send air to a space around said photoconductive element; and an air conditioning device configured to dehumidify air to be sent by said air sending device;

wherein an image forming module is removably mounted to a casing of an apparatus body; the image forming module includes the photoconductive element, charger and at least one developing device; and the air conditioning device sends dehumidified air into the image forming module;

wherein air sent into the image forming module is discharged to an outside of the image forming module only via an image transfer opening through which a part of the photoconductive element is exposed to the outside of the image forming module.

* * * * *